United States Patent [19]

Nolf et al.

[11] Patent Number: 4,913,522

[45] Date of Patent: Apr. 3, 1990

[54] ELECTROFIT FIBRE OPTICS BUTT SPLICE

[75] Inventors: Jean-Marie E. Nolf, Korbeck-L.; Joris R. I. Franckx, Bonheiden; Jos Doucet, Kessel-lo, all of Belgium

[73] Assignee: NV Raychem SA, Kessel-lo, Belgium

[21] Appl. No.: 262,067

[22] Filed: Oct. 24, 1988

Related U.S. Application Data

[63] Continuation of Ser. No. 110,051, Oct. 13, 1987, abandoned, which is a continuation of Ser. No. 721,527, Apr. 9, 1985, abandoned.

[30] Foreign Application Priority Data

Apr. 11, 1984 [GB] United Kingdom ................ 8409368

[51] Int. Cl.⁴ .............................................. G02B 6/36
[52] U.S. Cl. ................................. 350/96.20; 350/96.21
[58] Field of Search ..................... 350/96.20, 96.21; 264/1.5, 25, 230, DIG. 71

[56] References Cited

U.S. PATENT DOCUMENTS

| 4,373,776 | 2/1983 | Purdy | 350/96.2 |
| 4,422,890 | 12/1983 | Penneck | 264/230 X |
| 4,570,055 | 2/1985 | McMills | 264/230 X |

FOREIGN PATENT DOCUMENTS

| 0094848 | 11/1983 | European Pat. Off. | |
| 0159857 | 10/1985 | European Pat. Off. | 350/96.20 |
| 0020843 | 2/1977 | Japan | 350/96.21 |
| 0076313 | 6/1980 | Japan | 350/96.21 |

Primary Examiner—John D. Lee
Attorney, Agent, or Firm—Dennis E. Kovach; Herbert G. Burkard

[57] ABSTRACT

This invention provides an enclosure for a butt splice of optical fibre cables which includes organizer trays for storing the excess lengths of individual optical fibres. The enclosure and trays provide for access to the individual fibres for splicing or repair.

21 Claims, 9 Drawing Sheets

ELECTROFIT FIBRE OPTICS BUTT SPLICE

This application is a continuation of application Ser. No. 110,051, filed Oct. 13, 1987, which is a continuation of U.S. Ser. No. 721,527, filed Apr. 9, 1985 (both now abandoned).

BACKGROUND OF THE INVENTION The present invention relates to the provision of an environmental seal around a splice in one or more optical fibre cables.

Optical fibre cables comprise a bundle of optical fibres surrounded by a protective jacket. Since such cables are manufactured in finite lengths, any installation will in general require separate lengths of cable to be spliced together. A problem arises at the splice, not only in forming fibre splices of low light attenuation, but also in replacing the protective jacket which has to be removed in the region of the splice to expose the fibres. It is with this second problem that the present invention is concerned.

Splicing an optical fiber is a difficult business, requiring use of a machine for proper alignment of pairs of fibres before a permanent splice is made between each pair. The machine will of necessity be some short distance away from the ends of the intact portions of the cables to be joined, i.e. some distance from the ends of each cable jacket. The jacket of each cable to be joined may be stripped back a distance of, say, 1.5 m thereby exposing 1.5 m of optical fibres. It can be seen, therefore, that there is a further problem, namely the accommodation of a significant length of optical fibres within the environmental housing which is to replace the removed portions of cable jacket. Optical fibres are easily broken by being bent around too sharp a radius, and the housing must therefore provide some way of organizing the fibres along an acceptable path.

There are some further considerations. It will generally be desirable that any chosen fibre within the housing may be accessible, and therefore the fibres, which may number hundreds, should be organized within the housing in a regular fashion. Also, some means of identifying each fibre is desirable, and such means may have to be by way of its location within the housing since color coding of the fibre itself is difficult.

Various suggestions have been proposed for an optical fibre splice case which organizes the slack lengths of fibres and provides an environmentally sealed housing around them.

In European patent publication No. 0043570 there is proposed an optical fibre splice case through one side of which one cable enters and through an opposite side of which another cable enters. The ingoing cables are sealed to inlets of the case by shrinkable sleeves. Within the case is a series of plates, each with projections thereon around which are wound the spliced fibres, thereby storing the slack lengths in a path which does not result in damage to the fibres. Such a splice case is known as an in-line splice case since the cables enter the case from opposite ends, or at least from widely spaced positions. This may be contrasted with a butt cable splice where the cables are substantially mutually adjacent.

A similar series of plates for use in an in-line cable splice is disclosed in U.S. Pat. No. 4,266,853. Here the plates are stacked one on top of another and are hinged to a carrier. The hinging allows a chosen plate to be revealed for attention to a fibre splice it carries.

Optical fibre cables may be, for example, buried, aerial, or suspended between poles. In each case in addition to providing environmental protection, some mechanical strength has to be provided, and particular attention has to be given to axial pull strength in the case of aerial installations. Many of the prior art designs provide for axial pull strength in the following way. The cables themselves may be provided with a steel wire core, around which the fibres are located. In addition to preventing excessive bending of the cable, the core can be used to transmit axial load through the splice case, thus eliminating axial load on the fibres themselves. The way this is done is to strip back the jacket of each cable in the usual way to expose sufficient lengths of fibres for the splicing process to be carried out. The metal cores are cut to leave a short length protruding beyond each remaining cable jacket. The metal core of one cable is then clamped to one end of the splice case and the core of the other cable is clamped to the opposite end of the splice case. Thus, any axial load is transmitted from one core in a line through the case to the other core. Such an arrangement is disclosed in European Publication No. 0077115.

Various other designs for optical fibre splice cases are disclosed in DE 3006131, JP-A-55-127508, JP-A-55-127507, JP-A-55-100504 and JP-A-52-133146.

Although most of the designs proposed in the prior art are likely to be satisfactory each has a disadvantage due to its basic cable geometry. The splice cases tend to be bulky, difficult to remove from a manhole or pole where they are located, and difficult to re-enter for repair or testing. We have discovered that these problems can be overcome by a simple modification to the arrangement of the cables and organizer plates.

DESCRIPTION OF THE INVENTION

The present invention provides an assembly capable of enclosing a butt splice between at least two optical fibre cables, which comprise:

a hollow article having a least two mutually adjacent outlets capable of receiving respective cables; and at least one optical fibre organizer capable of being housed within the article and of storing a plurality of optical fibers, each of said fibres describing a path from one of the outlets to another of the outlets, said path having a minimum radius of curvature no smaller than the minimum bend radius of said optical fibre.

Although this design apparently goes against accepted teaching (as regards, for example, the axial-pull strength provided by the coupling of a core in an in-line splice), we have found that significant advantages are available. The product can be made easy to re-enter because an end, rather than a middle portion, of the assembly can be removed. This is because the cables to be spliced enter the assembly from one end. The assembly can be of substantially tubular design of small diameter and length, the design of the internal organizer can be made using a tubular article rather than a wrap-around sheet. Furthermore, the assembly can be easily removed from a man-hole or pole. This is because sufficient free cable will be available due to one of the ingoing cables having been bent in a curve in order to enter the assembly. (Imagine two horizontal cables to be spliced; one enters the assembly directly, and the other will curve through a semi-circle to enter the same end of the assembly.) If an in-line cable splice is used, there is either no cable slack at all and the splice cannot be moved; or the cable needs to curve at both ends requiring a larger man-hole or more extensive cable pole fixings.

We prefer that the hollow article comprises two readily disengageable parts, although it is to be noted that this is not essential for the re-enterable feature mentioned above. (A one-part design could be re-entered with a single cut, and resealed with a tubular rather than wrap-around replacement part.) A first part of the hollow article would carry the outlets, and a second part would be used in conjunction with the first part to provide the substantially closed hollow configuration. The first part is then preferably a base plate having two or more outlets, either as simple apertures or as tubular projections, and the second part preferably is generally cylindrical with one closed end, for example dome-shaped. The base plate mates with the open end of the dome to provide the hollow article. Some means of holding the two parts together will preferably be provided, although the two parts may simple be an interference fit. Examples of means for holding them together include screw-threads on the two parts, bayonet fixings on the two parts, catches on the two parts, a separate clamp, and a separate sealing band, for example a heat-shrinkable or otherwise recoverable band. Mechanical holding of the two parts may be combined with some environmental sealing means such as a gasket, O-ring, mastic seal or adhesive bond. An adhesive bond could be used in the absence of any mechanical fixing.

The outlets are preferably in the form of tubes protruding from the base (or other part) of the hollow article, and means are preferably provided for environmentally sealing the outlets to the cables that pass through them. For example, a clamp, such as a hose clamp, could be used around the tubular outlets. A second possibility is to provide an adhesive, a mastic, or other sealing material between the cables and the outlets. We prefer, however, that the outlets be heat-shrinkable or otherwise recoverable since a tight seal can thus be made between any given outlet and a wide variety of sizes of cables. Heat-recoverability may of course be used in conjunction with a sealing material such as a heat-activatable adhesive.

In general, the two or more outlets may be provided in two basic ways. Firstly they may be independent in the sense that the base (or other part) of the hollow article is moulded or otherwise formed with tubular outlets projecting therefrom at two or more separate positions. In a second technique one (or more) large outlet is provided on the hollow article, which is subsequently divided into the requisite number of smaller outlets; or, what may amount to the same thing, means is provided to obviate the re-entrant gaps that would otherwise provide leak paths between the two or more cables and the large conduit that carries them. This may be done either by providing a flexible seal around the two or more cables to change their combined reentrant cross-sectional shape into a generally circular shape compatible with that of the outlet, or by using a branch-off clip (such as that disclosed in GB 1604981 or 1604985) to deform the outlet to match the cross-sectional shape of the cables. (These techniques are illustrated in the drawings).

Whether or not independent conduits or a divided large conduit is used, a seal is preferably made or enhanced by the conduits or conduit being recovered into engagement with the cable or cables. Recovery is preferably brought about by heat. Heat may be supplied by a torch or a hot-air gun although neither of them can supply heat sufficiently locally to recover easily one only of several independent conduits. We prefer therefore to provide self-contained heating means, and the invention thus also provides an optical fibre splice case comprising: a hollow article having recoverable cable outlets with self contained heating means; and an optical fibre organizer.

The self-contained heating means preferably comprises an electrical heating means such as a resistive heating wire or a conductive polymer composition. We prefer that the electrical heating means is self-regulating with respect to temperature, and this may be achieved by using as the heater a polymeric composition loaded with a filler such as carbon to give a positive temperature coefficient of resistance. The heater may be a discrete heater in thermal contact with the recoverable outlets, or it may be integral with the outlets. Additionally or alternatively, the heater may have the function of activating a heat-activatable sealing material such as a hot-melt adhesive for further environmental sealing or engagement.

A preferred design of the optical fibre organizer will be considered. The organizer preferably comprises one or more trays on each of which may be stored a length of one or more optical fibres. For example, an organizer may have 5 to 10, preferable about 8 or 10, trays, and each tray may store 5-20, preferably about 10, optical fibres. An optical fibre cable enters the assembly through one outlet, intermediate lengths of the fibres it contains are stored on the trays, and the cable leaves the assembly through another of the outlets. Since the primary function of the assembly is to house a cable splice, each tray will also hold the fibre splice tubes themselves. A fibre splice tube is typically a small transparent tube into each end of which is inserted one of the two fibres to be spliced. The tube contains a curable composition, which is caused to set once the fibres have been correctly aligned therein. The trays may be provided with means such as recesses or clips to hold these fibre splice tubes. The assembly of the invention may also be used to house an intermediate section of a cable, where the jacket has been removed for testing or access, and where no fibre splices are present.

The trays are preferably stacked one on top of another and attached in that configuration to a carrier which may be attached to or integral with the base or other part of the hollow article. The attachment should be such that any chosen tray may be removed or exposed in order to attend to an optical fibre it carries.

We prefer that the trays are rectangular and are attached by means of a short side to a base of the hollow article. The trays may be hinged in order that they can be rotated away from the splice closure axis. In particular they may be hinged along an edge, preferably a short edge, so as to be movable to expose an underlying tray. The trays then extend lengthways away from the base and may be covered by a dome-shaped cover which provides a second part of the hollow article. The trays should be made as small as possible consistent with the fibres they carry following a path having a minimum radius of curvature equal to the minimum bend radius of the fibres in question. Preferably the path is no smaller than the permanent bend radius of the fibres. The length of each tray will depend on the length of each fibre that is required for the splicing operation to be carried out and this will depend on the splicing technique. Also each fibre may be wound around its path on the organizer two, three or more times, thus increasing storage by a factor of two, three or more. The extent to which this can be done will depend on the number of fibres to be stored on each tray and on the number of trays compared to the desired size of the assembly.

The path that each fibre follows on each tray is not critical, but for best use of space it will pass as close to each long edge as possible. A preferred path will therefore be oval, or rectangular with rounded short edges. Small pegs or other protrusions may be provided on each tray around which the fibres may be wound. The trays preferably have raised edges or rims to maintain a certain separation between them and to prevent fibre spillage from their edges. Each fibre preferably enters a tray along one long edge and leaves that tray from the opposite long edge. This arrangement allows shorter trays and better fibre organization than an alternative where the fibres enter and leave along the same edge. Due to the butt nature of the cable splice, the fibres will in general enter and leave each tray across the same short edge. An advantage of them entering across the same edge is that a space where the fibre bundles diverge from each cable to the various trays is only required at one end of the set of trays. Thus the splice case is shorter. If they entered across opposite short edges not only would the splice case be longer, it would also be of greater diameter due to the need for the fibre bundles to bend within the case and pass back down the case to pass through the outlets due to the overall butt-nature of the splice. This can only be avoided using an in-line splice which has other disadvantages as already mentioned.

The difficulty of making a splice between two optical fibres, and the need for a special splicing device were mentioned above. The entire operation of locating the cables to be joined, performing a large number of splices, sorting the spliced fibres, and then environmentally sealing the resulting splices is quite complex. We have developed an apparatus for simplifying this procedure in the field, which locates in the preferred relationship all of the articles required.

The invention therefore additionally comprises an apparatus comprising:

a frame having means for holding a device for effecting an optical fibre splice, a releasable clamp for holding a base of an assembly as defined above, and means for selectively exposing respective trays of a fibre optic splice organizer.

BRIEF DESCRIPTION OF THE DRAWINGS

The invention is further illustrated with reference to the accompanying drawings, in which.

DETAILED DESCRIPTION OF THE INVENTION

Figure 1:
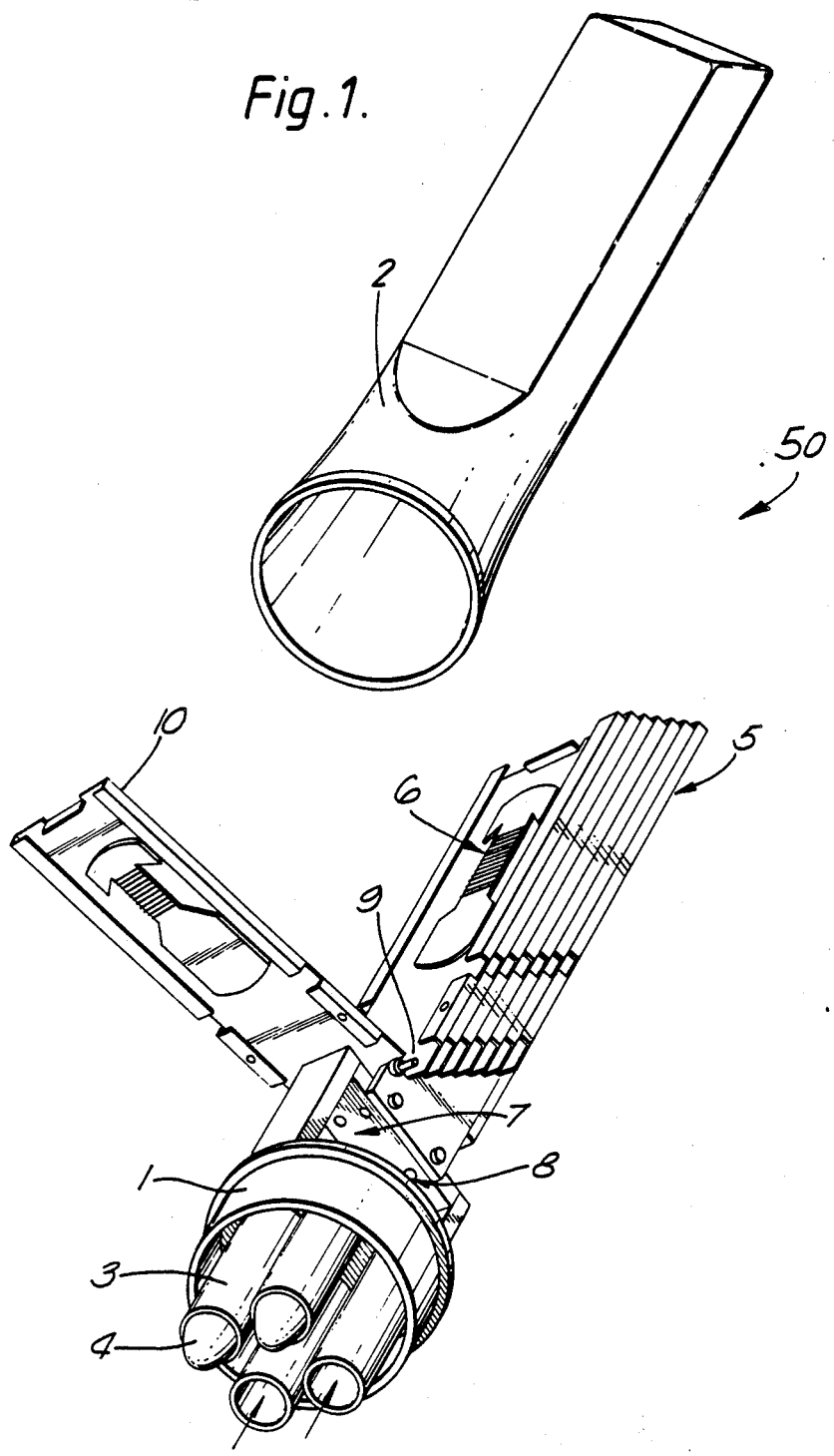
FIG. 1 shows a partially dismantled butt splice case of the invention.
Figure 2:
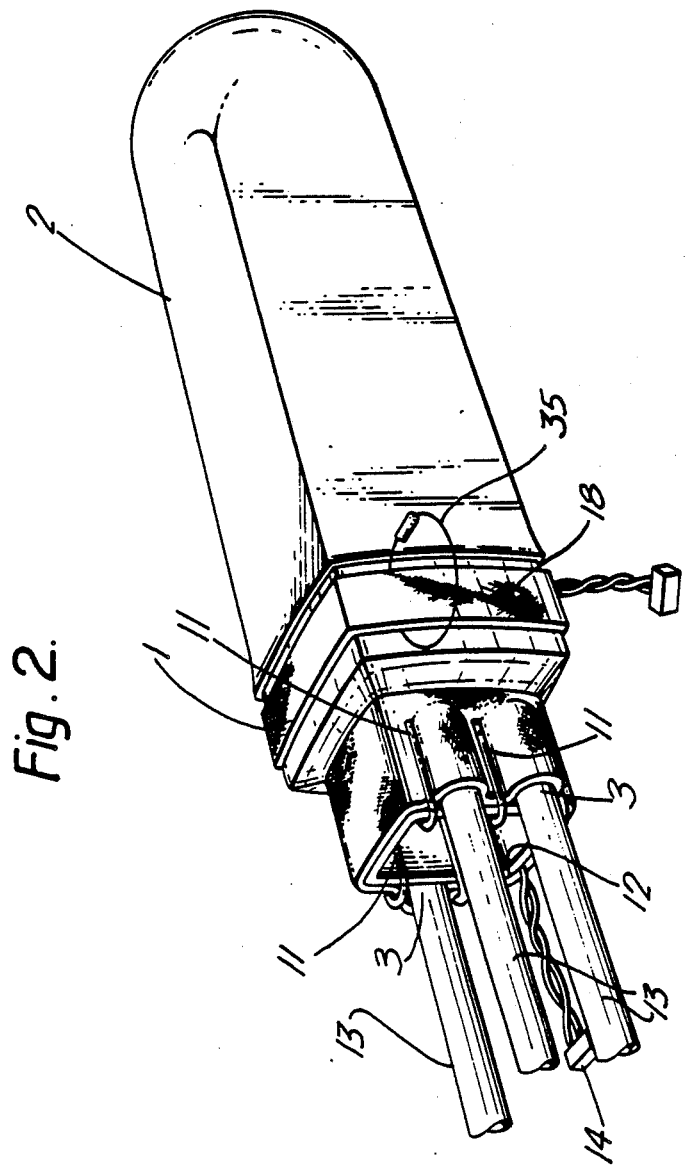
FIG. 2 shows a butt splice case employing branch-off clips and a junction box.

FIG. 1 shows a base plate 1 and a dome-shaped cover 2 which together form a hollow article 50 for use as a butt splice case for optical fibre cables 13 (FIG. 2). The base plate 1 is preferably manufactured by moulding from a glass-fibre filled high density polyethylene. Outlets 3 are provided in the base through which the cables 13 pass. On a new installation, only some of the outlets 3 may be required, and some may therefore be temporarily blocked as shown at 4. Such blocking may be by any suitable means, but we prefer that the outlets be made with closed ends which are simply cut off as required. The dome-shaped cover 2 may be blow-moulded and incorporate a moisture-vapour barrier such as a metal foil.

The hollow article 50 contains an optical fibre organizer which comprises a series of trays 5. Each tray preferably includes means 6 for accommodating splice tubes (not shown) which house fibre splices (not shown). The trays are preferably held in an orderly fashion on a carrier 7 which is fixed to the base 1. The trays are shown hinged along their short edges, but other hinging, for example, pivoting for rotation e.g., about one corner in the plane of the trays could be provided. The hinging allows chosen trays to be exposed for installation of the splice or for repair etc. Means is preferably also provided for locking the trays in their hinged position.

The assembly of the invention would be used as follows. Firstly, pass the two cables to be spliced in the direction of the arrows through two of the outlets 3 such that, say, 1.5 m of each cable protrudes into the splice case. The cable jackets are then removed back to the base 1 to expose 1.5 m of fibres. The strength core of each cable is then cut back, leaving enough remaining for it to be fastened into respective fastening holes 8. Each fibre of one cable is then spliced to the correct fibre of the other cable. Groups of say ten spliced fibres are then stored on each tray. When one tray is filled it is moved by hinging at 9 to expose another tray. Each tray preferably has a rim to ensure a sufficient separation between adjacent trays and to prevent fibre slippage from each tray.

In FIG. 1 the outlets 3 are shown as independent tubular projections, which are preferably produced by moulding integrally with the base. The outlets are preferably heat-shrinkable in order that seals can be made to the cables they carry.

An alternative technique of sealing the cables at their points of entry is shown in FIG. 2. A series of branch-off clips 11 is used in conjunction with a junction box 12 to deform the outlet 3 to conform to the cables 13. The junction box is positioned within the outlet 3 and the cables pass between the box and the outlet. The branch-off clips cause the outlet to be deformed around the cables into proximity with the box. The outlet is again preferably heat-shrinkable. FIG. 2 shows a further preferred feature which may be used in any of the embodiments; the outlet 3 is shrinkable by self-contained heating means, particularly by an electrical heater which is shown powered via conductors 14. Also shown is a band 18 which joins together base and dome portions of the slice case. This band 18, which is also electrically heat-shrinkable, is provided with self-contained cutting means 35 for re-entry into the splice case. A disadvantage of the use of one outlet 3 which is subdivided is that all cables are preferably installed in that outlet before recovery can be used to seal any of them. The independent outlets illustrated in FIG. 1 allow independent sealing of each cable, and therefore an initial partial installation, followed by addition of further cables at a later date. The embodiment of FIG. 2 could, however, be modified to allow for this by the use of blank plugs.

Figure 3:
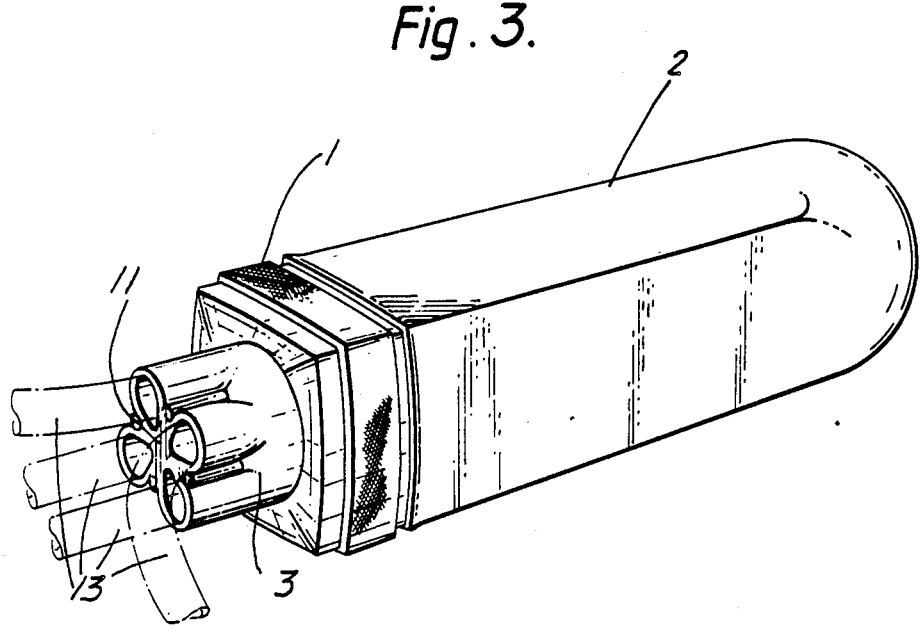
FIG. 3 shows a butt splice case employing branch-off clips.
Figure 4:
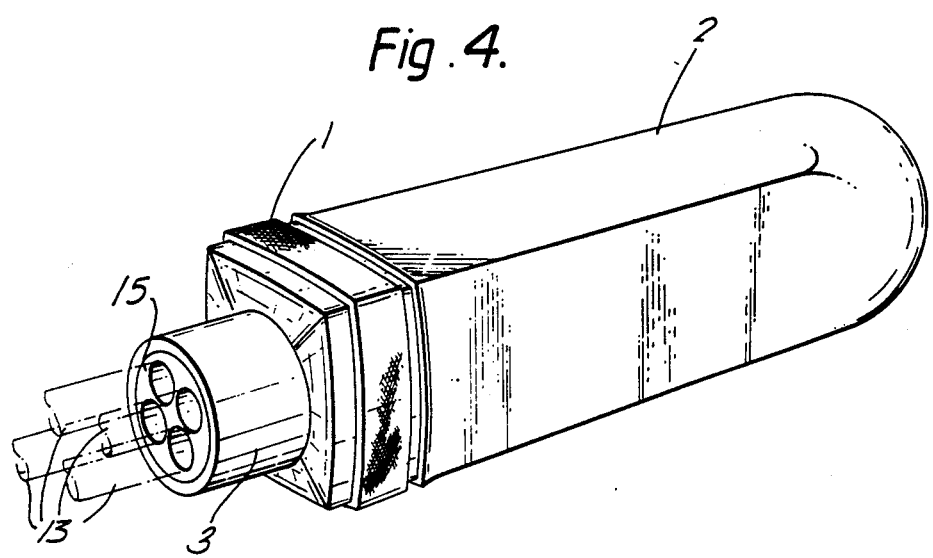
FIG. 4 shows the use of a flexible seal in a butt splice case.

FIGS. 3 and 4 show alternative ways of using one large outlet to seal several cables 13. In FIG. 3 a four legged branch-off clip or clips 11 is used, and in FIG. 4 a flexible seal 15 (such as that disclosed in GB 2124439) is used around the cables 13 to change their combined re-entrant cross-sectional shape into a circular shape compatible with the circular shape of the outlet 3. As before, the outlets 3 are preferably heat-shrinkable, especially by electrical power.

Figure 5A:
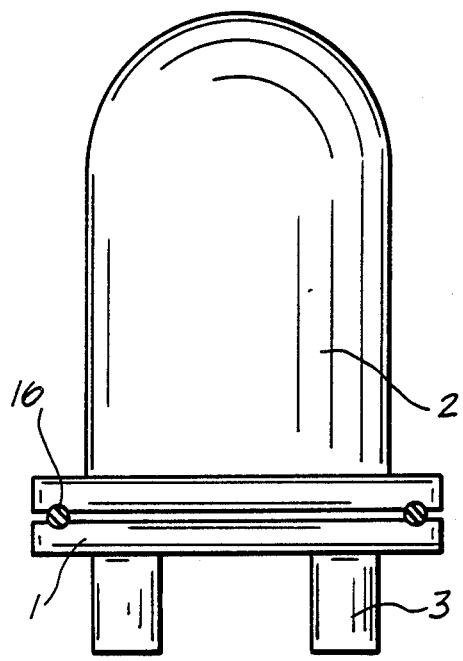
FIGS. 5a–5b and 6a–6b show two techniques of joining base plates and domes.
Figure 5B:
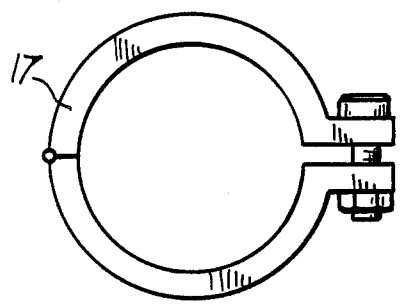
Figure 6A:
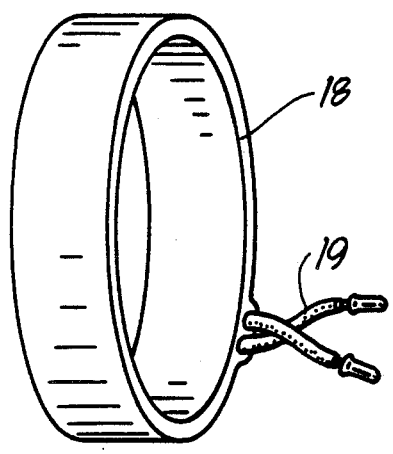
Figure 6B:
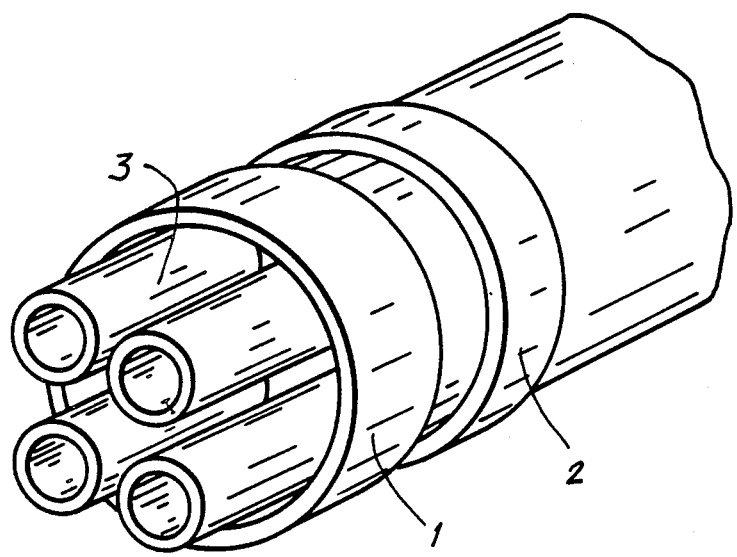

FIGS. 5 and 6 show ways of attaching together first and second parts of the hollow article. In FIG. 5 an O-ring 16 provides a seal between the two parts which are mechanically held together by a circular clamp 17. The technique in FIG. 6 is to use a band 18 of heat-shrinkable material (also shown in FIGS. 2) around the join line between the base 1 and the dome-shaped cover 2 of the hollow article. The band 18 is preferably shrinkable by electrical power via conductors 19. Electrical heat-shrinkability here is conveniently used in conjunction with electrically shrinkable outlets 3.

Figure 7:
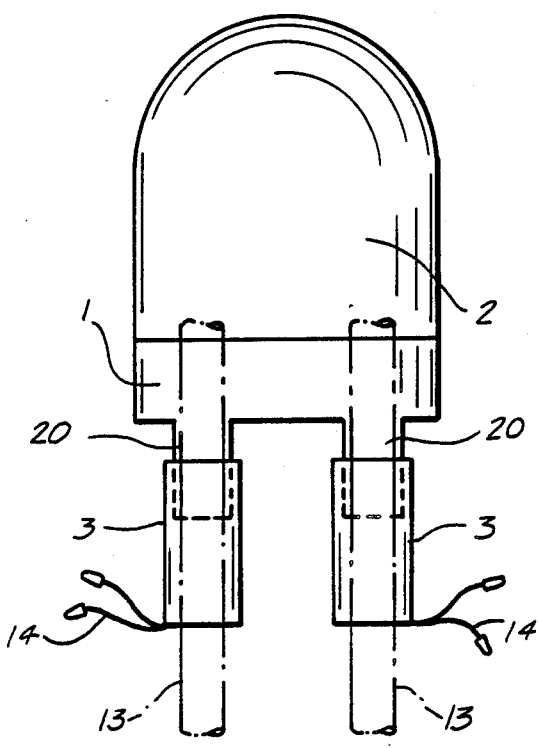
FIG. 7 shows discrete recoverable outlets for a butt splice case.

The use of discrete electrically shrinkable outlets 3 is shown in FIG. 7. The outlets 3 are shrunk into engagement with the cables 13 and projections 20 on the base 1. The outlets 3 in this case may be pre-shrunk onto the projections 20, leaving only shrinkage onto the cables 13 to be performed in the field. Alternatively, the entire installation of the outlets could be performed in the field.

Figure 8A:
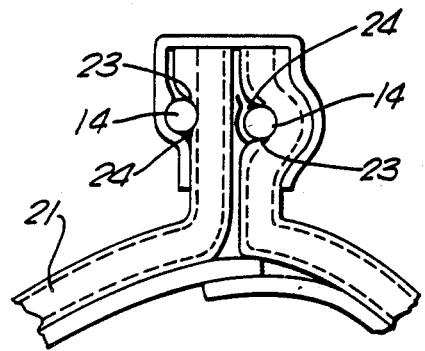
FIGS. 8a and 8b show construction of preferred electrically recoverable outlets.
Figure 8B:
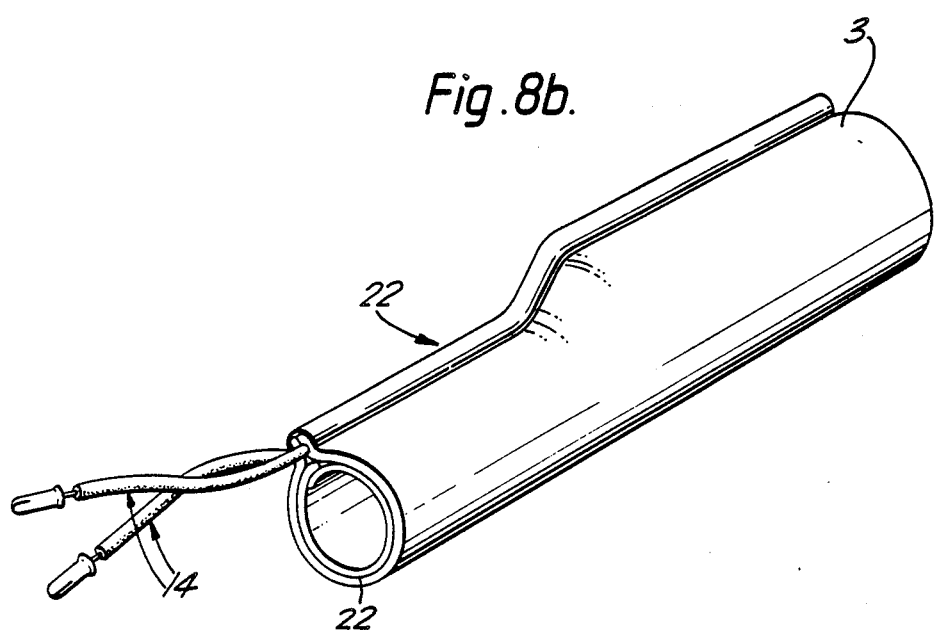

FIGS. 8a and 8b illustrate a preferred design of electrically shrinkable outlets, which is most applicable to discrete outlets as illustrated in FIG. 7. The material constituting the tubes 3 comprises a laminate of a recoverable conductive polymer composition 21 sandwiched between two perforated electrodes, shown dotted in FIG. 8a. The electrodes are perforated to allow them to collapse as the outlet shrinks. Each electrode is covered with a layer of insulation. In the embodiment illustrated, the tubular outlets 3 are formed from sheet material by bringing together opposing edges and clamping or bonding them at region 22. At the edge regions, opposite layers of insulation 23 and 23 are removed to exposed the two electrodes. We prefer that the electrical heating provided by the conductive polymer composition be self-regulating, and therefore a polymer exhibiting a positive temperature coefficient of resistance (PTC) is preferably used. In order to improve the electrical performance of the system, electrical contact to the electrodes is preferably made via a resistance material of constant-wattage behaviour. This is achieved by providing a tape 24 of zero temperature coefficient of resistance (ZTC) as illustrated. The power is supplied via conductors 14. When electrical power is applied, current flows through the thickness of the material 21, causing it to become hot and thus to shrink. In the outlet illustrated the heater and the heat-shrinkable material are one and the same; it is possible however to provide a discrete heater in thermal contact with a heat-recoverable outlet. The outlet shown is provided with an internal layer of a sealing material (shown cross-hatched). The sealing material is preferably heatactivatable, and we prefer a hot-melt adhesive.

The outlet shown in FIG. 8b is stepped to accommodate the different sizes between the projection on the base (see part 20 in FIG. 7) and the cables it will carry.

Figure 9A:
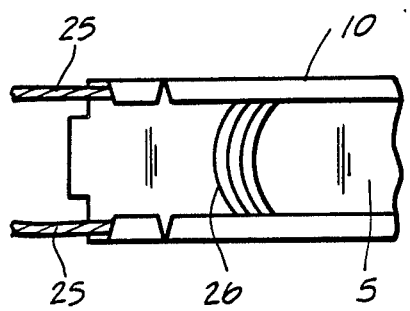
FIG. 9a and 9b illustrate fibre arrangements on trays of an optical fibre organizer.
Figure 9B:
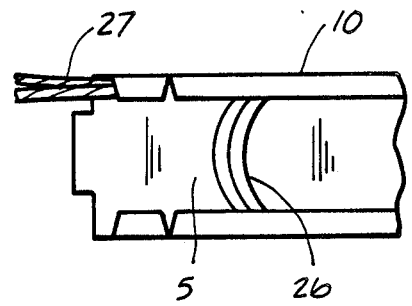

FIG. 9 shows in part rectangular trays 5 which constitute an optical fibre organizer. Two fibre paths are illustrated. In FIG. 9a a bundle of fibres 25 is shown entering the tray along one long edge and leaving along an opposite long edge. The fibres follow a generally oval path on the tray, one end of the oval being shown at 26 where the paths of several fibres or several turns of the same fibre are illustrated. In FIG. 9b the fibre bundles 27 leave and enter along the same long edge. The arrangement of FIG. 9a is preferred.

Figure 10A:
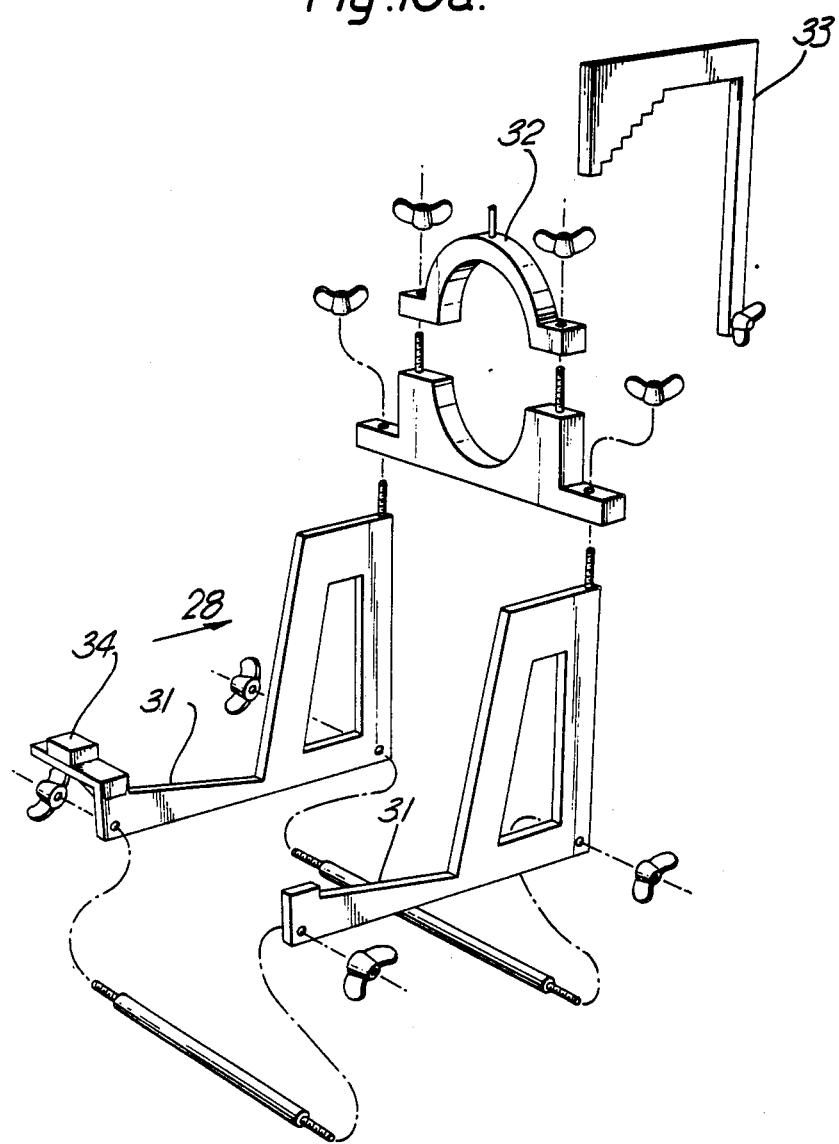
FIGS. 10a and 10b show an apparatus for performing cable splicing and environmental sealing.
Figure 10B:
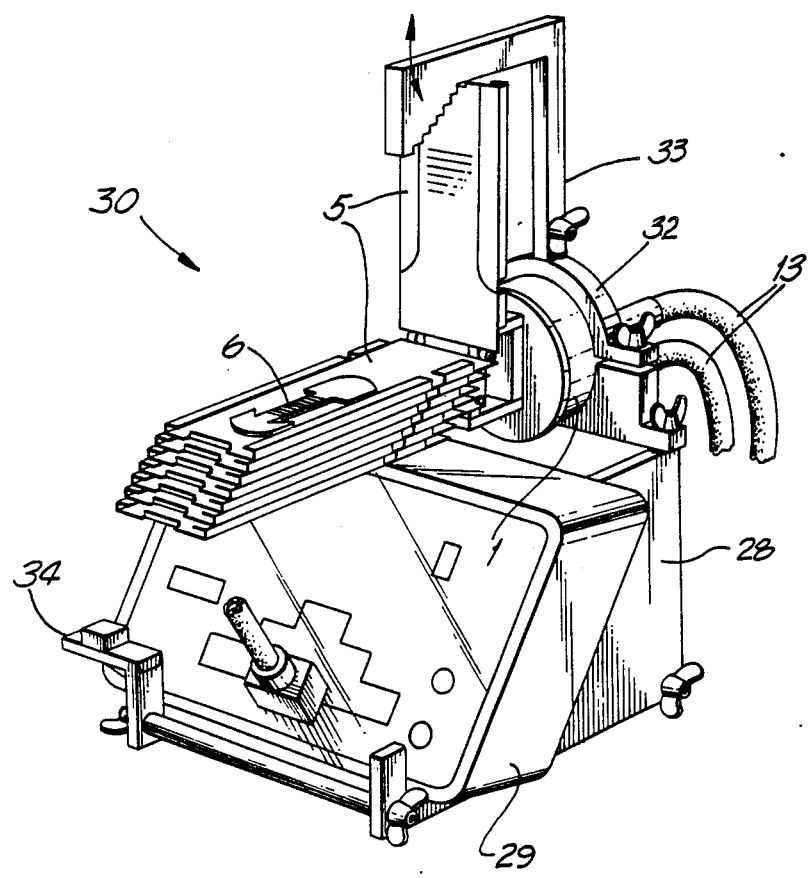

FIG. 10 shows an apparatus 28 for carrying out a combined splicing and sealing operation. The apparatus 28 itself is shown at FIG. 10a, and the apparatus in conjunction with a splicing machine 29 and an assembly of the invention 30 is shown in FIG. 10b.

The apparatus 28 comprises: a frame having means 31 for holding the splicing device 29; a releasable clamp 32 for holding the butt splice case, or preferably a base 1 thereof; and means 33 for selectively exposing respective trays 5.

The component parts of a preferred frame are shown in FIG. 10a and a detailed description is not necessary. A few features may, however, be mentioned. The means 31 for holding the splicing device may carry a microscope or may simply hold the splicing device at any angle, preferably 8°–20°, especially about 15°, which makes viewing the device's own microscope easier. A cutter 34 is preferably provided to make a clean, properly angled, end to the fibres before splicing. The means 33 is preferably hinged so that the top bar can move as indicated by the arrow in FIG. 10b, thus allowing selected trays to be held in the upright position.

What is claimed is:

1. An assembly for providing an environment seal for an optical fiber cable, which comprises:
   a hollow article comprising a base plate and a hollow cover disengageable from the base plate, the base plate having at least two mutually adjacent outlets capable of receiving respective optical fibre cables;
   at least one optical fibre organizer housed within the article for storing a plurality of optical fibres in a path from one of the outlets to another of the outlets, said path having a minimum radius of curvature no smaller than a minimum bend radius of said optical fibres; and
   first means for connecting the base plate to the hollow cover and second means for connecting the at least one optical fibre organizer to the base plate such that when the first and second means are so connected the optical fibres are stored in at least one storage plane and when the first means is disconnected the hollow cover is removable from the base plate by being moved along a direction substantially parallel to the storage plane, the storage plane being substantially parallel to a longitudinal axis of the base plate outlets.

2. An assembly according to claim 1, which additionally comprises a band of recoverable material which bridges a perimeter of the base plate and a perimeter of the hollow cover so as to sealingly connect the base plate to the hollow cover.

3. An assembly according to claim 1, in which the optical fibre organizer comprises a plurality of optical fibre trays and further comprising a tray carrier, each of the trays being hinged to the carrier.

4. An assembly according to claim 3, in which said trays having raised edges or rims to maintain a certain separation between them and to prevent fibre spillage from their edges.

5. An assembly according to claim 1, in which the outlets comprise tubular recoverable outlets which are recovered onto the optical fibre cables so as to be sealingly engaged therewith.

6. An assembly according to claim 5, the outlets extending from the base plate so as to be substantially parallel to one another and to the storage plane.

7. An assembly according to claim 6, in which the first means in shrinkable so as to sealingly engage the base plate and the hollow cover.

8. An assembly according to claim 5, in which each of said outlets comprises an independent tubular member.

9. An assembly according to claim 8, further comprising means for subdividing a single tubular member into at least two channels.

10. An assembly according to claim 5, in which the outlets include self-heating means for sealingly engaging an optical fibre cable.

11. An assembly according to claim 10, in which the self-heating means comprises an electrical heater.

12. An assembly according to claim 11, in which the outlets comprise a recoverable conductive polymeric material.

13. An assembly according to claim 12, in which the conductive polymeric material exhibits positive temperature coefficients of resistance behaviour.

14. An assembly according to claim 1, in which the first means is shrinkable so as to sealingly connect the base plate to the hollow cover.

15. An assembly according to claim 14, in which the first means comprises a band which includes a self-contained means for cutting and reentering the article.

16. An assembly according to claim 1, in which the optical fibre organizer comprises a plurality of trays connected to the base plate in a pivotable manner about a plurality of substantially parallel lines each of which is substantially parallel to the storage plane, each tray being capable of storing a plurality of the optical fibres in a plurality of secondary planes which are parallel to the storage plane, the pivoting parallel lines extending from the storage plane in a stair step manner.

17. An assembly according to claim 16, in which each of the pivoting parallel lines is substantially perpendicular to the direction the hollow cover is moved when being removed from the base plate.

18. An assembly according to claim 1, in which each optical fibre organizer is rectangular, the second means connecting a short side of each organizer to the base plate.

19. An assembly according to claim 1, in which the optical fibre organizer comprises a plurality of trays that are hinged along an edge thereof so as to be movable to expose an underlying tray.

20. An assembly according to claim 1, further comprising a tray carrier, the optical fibre organizer comprising a plurality of trays attached to the carrier, said carrier being integral with or attached to the base plate and having fastening holes to which a strength core of one of the cables may be attached.

21. The assembly of claim 1, the organizer including means for storing fibre splices which splice fibres from the respective optical fibre cables together.

* * * * *

UNITED STATES PATENT AND TRADEMARK OFFICE
CERTIFICATE OF CORRECTION

PATENT NO. : 4,913,522
DATED : April 3, 1990
INVENTOR(S) : Jean-Marie E. Nolf; Joris R. I. Jos Doucet It is certified that error appears in the above-identified patent and that said Letters Patent is hereby corrected as shown below:

Column 3, line 19, delete "simple" and insert therefor --simply--.

Column 4, line 27, delete "preferable" and insert therefor --preferably--.

Column 6, line 67, delete "slice" and insert therefor --splice--.

Column 7, line 50, delete "and 23";
         lines 50-51, delete "exposed" and insert therefor --expose--.
Column 9:
Claim 7, line 2, delete "in" and insert therefor --is--.

Signed and Sealed this

Twentieth Day of October, 1992

Attest:

DOUGLAS B. COMER

*Attesting Officer*     *Acting Commissioner of Patents and Trademarks*